United States Patent Office 3,415,896
Patented Dec. 10, 1968

3,415,896
PREPARATION OF BIPHENYLS BY CATALYTIC TRANSFER HYDROGENOLYSIS AND NOVEL PRODUCTS SO PRODUCED
Allan S. Hay, Schenectady, N.Y., assignor to General Electric Company, a corporation of New York
No Drawing. Filed June 23, 1967, Ser. No. 648,236
9 Claims. (Cl. 260—668)

ABSTRACT OF THE DISCLOSURE

Biphenyls having at least one hydroxy, methoxy, phenoxy or amino substituent, acting as hydrogen acceptors, have been found to undergo catalytic transfer hydrogenolysis with cyclohexyl-substituted benzenes or cyclohexyl-substituted biphenyls, acting as hydrogen donors, with both reactants producing biphenyls. The reaction permits the preparation of novel substituted biphenyls. The biphenyl products of this reaction are useful as stable, high-temperature heat-transfer fluids.

This invention relates to a novel process for producing biphenyls, especially substituted biphenyls, and to the novel substituted biphenyls produced thereby. More specifically, this invention relates to the preparation of biphenyls by reacting biphenyls having at least one hydroxy, methoxy, phenoxy or amino substituent, any other substituents being methyl, phenyl or methyl-substituted phenyl, with either a benzene having at least one cyclohexyl substituent, or a biphenyl having at least one cyclohexyl substituent, any other substituents on the benzene or biphenyl nuclei, being hydroxy, methyl, phenyl, or methyl-substituted phenyl, in the presence of a hydrogenation catalyst, preferably selected from the group consisting of nickel, platinum and palladium.

The biphenyl reactant having the above defined substituents acts as a hydrogen acceptor and the cyclohexyl-substituted benzene and the cyclohexyl-substituted biphenyl both acts as hydrogen donors in a catalytic transfer hydrogenolysis reaction whereby the cyclohexyl substituents are aromatized and the substituted biphenyl is hydrogenated only to the extent that removal of the hydroxy, methoxy, phenoxy or amino substituent results, so that, both reactants produce a biphenyl. Hereinafter for brevity and clearness the biphenyl reactant, as defined above, generally will be referred to as the biphenyl hydrogen acceptor and the cyclohexyl-substituted reactant, as defined above, generally will be referred to as the cyclohexyl hydrogen donor.

Other substituents such as halogen or long-chain alkyl on either reactant would also undergo reaction leading to complication of the reaction. However, if the other substituents on either reactant are methyl, phenyl or methyl substituted phenyl, they are not removed during the catalytic transfer hydrogenolysis reaction and will remain as substituents on the biphenyl product. If the cyclohexyl hydrogen donor also contains a hydroxy group, the latter will be removed during the reaction but does not lead to any complication.

When benzene is passed through a hot tube, biphenyl is the chief product. Some of the biphenyl produced reacts with additional benzene or with itself to produce small amounts of the terphenyl isomers and p-quaterphenyl. This reaction is not suitable for making substituted biphenyls from substituted benzenes. The general method for making substituted biphenyls other than the above-mentioned terphenyls and quaterphenyl, which may be considered phenyl-substituted biphenyls, involves making the appropriate halo-derivative, generally the iodo-derivative of the substituted benzene which is then reacted in the presence of copper powder at temperatures in the neighborhood of 250 to 300° C. or higher to produce substituted biphenyls. This is generally not a high yield reaction and is expensive not only because of the high cost of producing the iodo compound, but also because of the large amount of copper powder that is necessary.

In my copending application, Ser. No. 556,575, filed June 10, 1966, as a continuation-in-part of my copending applications 306,301 and 306,302, both filed Sept. 3, 1963, all of which are assigned to the same assignee as the present invention, I have disclosed and claimed a novel reaction of phenols with diphenoquinones to produce biphenols.

I have now discovered that these biphenols may be dehydroxylated to the corresponding biphenyl by reacting them with cyclohexyl-substituted benzenes including cyclohexyl-substituted hydroxybenzene (i.e., cyclohexyl-substituted phenols) or cyclohexyl-substituted biphenyls, including cyclohexyl-substituted hydroxybiphenyls (i.e., cyclohexyl-substituted phenylphenols, cyclohexyl-substituted biphenols, etc.), in the presence of a hydrogenation catalyst, preferably nickel, platinum or palladium at a temperature in the range of from 300 to 500° C. in the substantial absence of oxygen, in an autoclave or other pressure vessel to maintain the reactants in the liquid phase, and to avoid the loss of any of the reactant by volatilization. Under these conditions, hydrogen is transferred from the cyclohexyl-substituted reactant, i.e., the cyclohexyl hydrogen donor, to the biphenol, i.e., the biphenyl hydrogen acceptor, and removes the hydroxyl group in the form of water. If a cyclohexyl-substituted hydroxybenzene or cyclohexyl-substituted hydroxy-biphenyl is used as the hydrogen donor, the hydroxy group is also removed from this compound. The net result of this reaction is that a biphenyl is produced from both the biphenol and the cyclohexyl-substituted reactants.

Further study of this reaction, led to the discovery that the hydroxy group could also be in the form of its methyl or phenyl ether and that the reaction was equally applicable for the deamination of amino ($-NH_2$) substituted biphenyls. All of these materials, therefore could be used as the biphenyl hydrogen acceptor. I also found that, if any other substituents on the biphenyl hydrogen acceptor or the cyclohexyl hydrogen donor were methyl, phenyl or methyl-substituted phenyl, these substituents were not removed during the reaction and therefore remained as substituents on the biphenyl products from each reactant.

My reaction, therefore, is applicable to the removal of —OR groups and $-NH_2$ groups where R is hydrogen, methyl, phenyl and methyl-substituted phenyl, i.e., mono-, di-, tri-, tetra- and pentamethylphenyl, from a biphenyl containing at least one such substituent and simultaneously dehydrogenating a benzene or biphenyl having at least one cyclohexyl-substituent or dehydrogenating and dehydroxylating a hydroxybenzene or hydroxybiphenyl having at least one cyclohexyl substituent. Any remaining substituents on the carbon atoms of the phenyl nuclei of the biphenyl hydrogen acceptor or cyclohexyl hydrogen donor can be those substituents which are defined by R above, i.e., hydrogen, methyl, phenyl and methyl substituted phenyl, and will remain as substituents on the biphenyls produced by this reaction.

It is readily seen that the particular biphenyl hydrogen acceptor and the particular cyclohexyl hydrogen donor can be in many cases, so chosen, that each will produce the same biphenyl. Since this eliminates the necessity for separating two different biphenyl products from the reaction mixture, it is the preferred method of carrying out the reaction when the desired reactants are available.

Generally, when aryl compounds, which are substituted by hydroxy, ether or amino groups are hydrogenated, only the aryl ring is hydrogenated as the primary reaction without removal of the hydroxy, ether or amino groups. In fact, most amino groups are introduced on an aromatic nucleus by first nitrating the aryl nucleus and thereafter hydrogenating the nitro group to the amino group. In order to remove an amino group from an aryl nucleus, it has previously been necessary to form the diazonium salt of the amino group which is then reacted with an alcohol, such as ethanol, whereby the diazonium salt is decomposed to nitrogen and the alcohol is oxidized to corresponding aldehyde.

Under vigorous hydrogenation conditions, phenols have been dehydroxylated to the corresponding aryl compound, but this has been accomplished by a series of reactions, first involving the hydrogenation of the phenol to the corresponding cyclohexanol. The final reaction mixture contains not only the aromatic hydrocarbon from the phenol, but the various hydrogenation and dehydrogenation products of the cyclohexyl derivatives, i.e., the cyclohexanol derivative, cyclohexanone derivative, cyclohexene derivative, etc. In British Patent 310,055, there is disclosed a reaction whereby a hydrogenated compound is caused to react with a compound capable of taking up hydrogen in the presence of a hydrogenation catalyst. An example is given whereby cyclohexanol and phenol are reacted with both products producing cyclohexanone.

In view of the above reactions, it was indeed surprising to find that when I reacted a biphenyl containing at least one hydroxy, methoxy, phenoxy or amino group with a cyclohexyl substituted benzene or cyclohexyl substituted monocyclic phenol, that the biphenyl was not hydrogenated, but instead the hydroxy, methoxy, phenoxy or amino group was preferentially removed from the biphenyl as well as from the cyclohexyl-substituted hydroxybenzene or cyclohexyl-substituted biphenyl if either was used as the hydrogen donor.

In order to avoid possible hydrogenation of the biphenyl hydrogen acceptor, the amount of cyclohexyl hydrogen donor used should be no greater than the stoichiometric amount necessary to supply the amount of hydrogen required to remove all of the hydroxy, methoxy, phenoxy or amino groups present in either of the reactants. If less than the stoichiometric amount of the hydrogen donor is used, then incomplete removal of the hydroxy, methoxy, phenoxy and amino substituents will result. Use of greater than stoichiometric amount of the hydrogen donor, of course, will result in some hydrogenation of the biphenyl product. It in apparent, therefore, that, for highest yields of the desired biphenyl product, the cyclohexyl hydrogen donor should be used in the amount required by the stoichiometry involved. The reaction involved is irreversible.

Each hydroxy or amino group to be removed, requires two atoms of hydrogen, one atom of hydrogen replaces the hydroxy or amino group on the biphenyl nucleus with the other hydrogen atom forming water with the hydroxy group and ammonia with the amino group. In the case of the methoxy and phenoxy substituents, i.e., four atoms of hydrogen are required. This is because in the breaking of the ether linkage, the oxygen bond can be ruptured on either side of the oxygen atom, leaving in one case a hydroxy substituent on the biphenyl nucleus with benzene or methane coming off as the product, or, in the other case, a hydrogen replacing the phenoxy group on the biphenyl nucleus with a phenol or methanol being the by-product which is then further dehydroxylated by the same reaction to benzene or methane and water. Since each cyclohexyl group in the hydrogen donor will supply six atoms of hydrogen, each cyclohexyl group in the hydrogen donor is capable of removing three hydroxy or amino groups present either in the hydrogen acceptor or the hydrogen donor, but is capable of removing only one and one half methoxy, phenoxy, or methyl-substituted phenoxy substituents on the diphenyl hydrogen acceptor.

The stoichiometry involved is illustrated by the following equations:

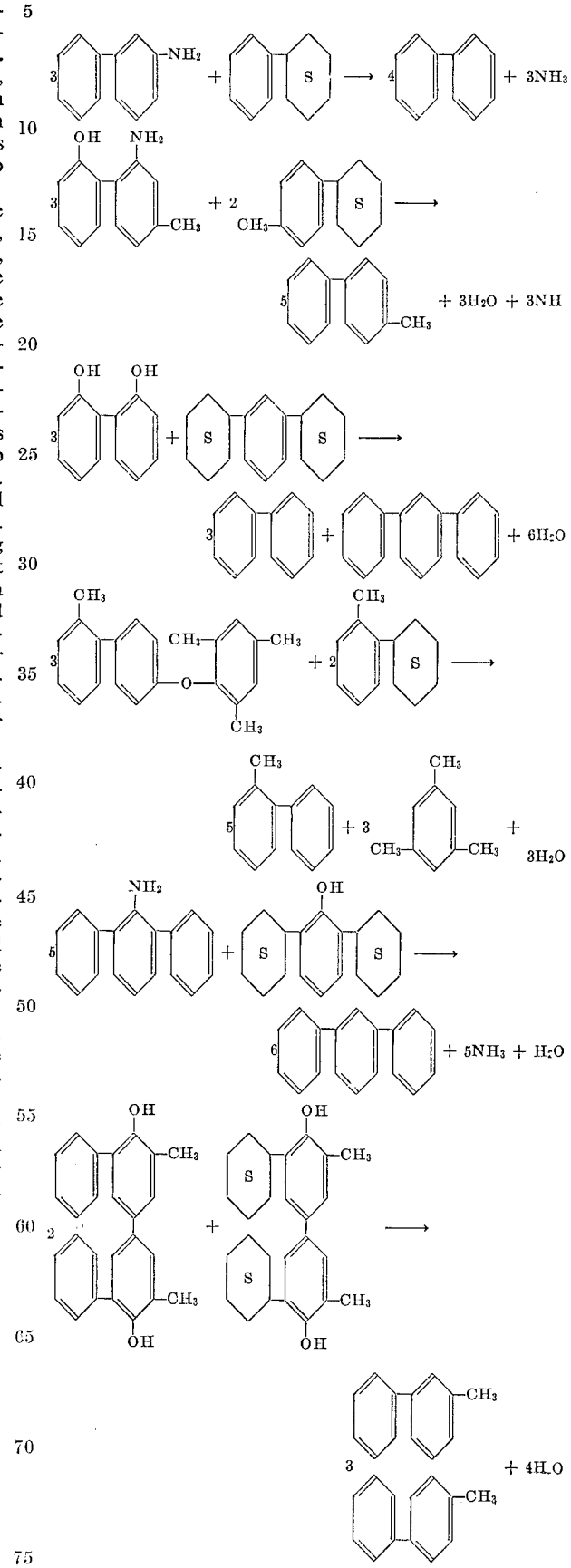

It is clear from what has been said above that each one of the biphenyl hydrogen acceptors and cyclohexyl hydrogen donors shown in the above equations can have one or more hydroxyl groups, one or more methyl groups, one or more phenyl groups or one or more methyl-substituted phenyl groups as substituents on the carbon atoms of the benzene nuclei. In addition, the biphenyl hydrogen acceptor, may have one or more amino groups, one or more methoxy groups, one or more phenoxy groups, including methyl-substituted phenoxy groups. The total number of these substituents can be up to the total number of replaceable hydrogens on the benzene nuclei present in either the biphenyl hydrogen acceptor or the cyclohexyl hydrogen donor.

Typical examples of the biphenyl hydrogen acceptors which I may use are

2-, 3- and 4-aminobiphenyl (2-, 3- and 4-biphenyl amines,
2-, 3- and 4-hydroxybiphenyl (o-, m- and p-phenylphenols),
2-, 3- and 4-methoxybiphenyl,
2-, 3- and 4-phenoxybiphenyl, the various isomeric tolyl, xylyl, trimethylphenyl, and tetramethylphenyl ethers of 2-, 3- and 4-hydroxybiphenyl,
the pentamethylphenyl ether of 2-, 3- and 4-hydroxybiphenyl,
2-amino-2′, 6-dimethylbiphenyl (2′,6-dimethylbiphenyl-2-amine),
2-amino-2′-methylbiphenyl,
2-amino-2′,4,4′6-tetramethylbiphenyl,
2-amino-2′,4′,6′-trimethylbiphenyl,
3-amino-2′,6-dimethylbiphenyl,
3-amino-5-methylbiphenyl,
4-amino-2′,3-dimethylbiphenyl,
4-amino-2′,3,4′,6′-tetramethylbiphenyl, the various isomeric diaminobiphenyls (biphenyldiamines), e.g., 2,2′-, 2,4′-, 3,3′-, 3,4′, 4,4′-diaminobiphenyl, etc.,
4,4′-diamino-2,2′-dimethylbiphenyl,
3,3′-diamino-2,2′,4,4′,6,6′-hexamethylbiphenyl,
4-phenyl-2,6-di-p-tolylaniline,
2,4-diphenyl-6-p-tolylaniline,
2,4,6-triphenylaniline,
m-terphenyl-4′-amine (4-amino-2-phenyldiphenyl),
o-terphenyl-2-amine,
p-terphenyl-2′-amine,
4″-methoxy-p-terphenyl-4-amine,
3-amino-4-hydroxybiphenyl,
4-amino-4′-hydroxybiphenyl,
5-amino-2-hydroxybiphenyl,
2-amino-4-methoxybiphenyl,
2-amino-2′-phenoxybiphenyl,
4-amino-2,2′-dimethoxybiphenyl,
4,4′-diamino-3,3′-dimethoxybiphenyl,
4,4′-diamino,
3,3′-diphenoxybiphenyl,
4,4′-diamino-3,3′-dimethoxybiphenyl,
4,4′-diamino-3,3′-diphenoxybiphenyl,
p-terphenyl-4,4″-diamine,
2,2′-dimethoxy-3,3′-dimethylbiphenyl,
2,4′-dimethoxy-3,3′-dimethylbiphenyl,
2,4-dimethoxy-3-phenylbiphenyl,
3,5-dimethoxy-2-phenylbiphenyl,
4-hydroxy-2-methylbiphenyl, the various diphenylhydroquinones, e.g., 2,5-diphenylhydroquinone, etc., the various isomeric di-tolylhydroquinones, e.g., 2,5-di-p-tolylhydroquinone, etc., the various di-xylylhydroquinones, the various isomeric dihydroxybiphenyls (biphenols), e.g., 2,2′-, 2,4′-, 2,5-, 3,3′-, 3,4- and 4,4′-dihydroxybiphenyls,
2,2′-dihydroxy-3,3′-dimethylbiphenyl (6,6′-dimethyl-o,o′-biphenol) or o,o′-bi(o-cresol),
2,2′-dihydroxy-5-dimethoxybiphenyl,
2,2′-dihydroxy-6,6′-dimethylbiphenyl,
2,5′-dihydroxy-2′,5-dimethylbiphenyl,
2,2′-dihydroxy-3,3′,5,5′-tetramethylbiphenyl,
4,4′-dihydroxy-3,3′,5,5′-tetramethylbiphenyl,
3,3′,5,5′,-tetrahydroxybiphenyl,
2′,3″-dimethoxy-p-quaterphenyl (2,3-dimethoxy-1,4-diphenylbiphenyl),
2-hydroxy-2′-methoxy-5,5′-dimethylbiphenyl,
4,4′-dihydroxy-3,3′,5,5′-tetramethoxybiphenyl,
3,3-dihydroxy-6,6′-diaminobiphenyl,
2,2-hydroxy,
4,4′-dimethoxybiphenyl, etc.

Typical examples of the cyclohexyl substituted hydrogen donors which I can use are, by way of example;

cyclohexylbenzene,
1,3-dicyclohexylbenzene,
1,4-dicyclohexylbenzene,
1,3,5-tricyclohexylbenzene,
1,2,4,5-tetracyclohexylbenzene,
4-cyclohexyl-1,3-dimethylbenzene,
2,5-dicyclohexyl-1,4-dimethylbenzene,
5-cyclohexyl-1,4-dimethylbenzene,
2,4-dicyclohexyl-1,3,5-trimethylbenzene,
2,4-dicyclohexyl-1,3,5-trimethylbenzene,
4′-cyclohexyl-1,3-dihydroxybenzene,
2-cyclohexylphenol (1-cyclohexyl-2-hydroxybenzene),
4-cyclohexyl-3-methylphenol,
2-cyclohexyl-3-methylphenol,
4-cyclohexyl-2-methylphenol,
5-cyclohexyl-2-methylphenol,
2,4-dicyclohexyl-3-methylphenol,
4,6-dicyclohexyl-3-methylphenol,
4,6-dicyclohexyl-3-methylphenol,
2-cyclohexyl-3-methylphenol,
3-cyclohexyl-p,p′-biphenol (2-cyclohexyl-4,4′-dihydroxybiphenyl),
2,2′-dicyclohexyl-p,p′-biphenol,
2,2′-dicyclohexyl-6,6′-dimethyl-p,p′-biphenol,
2,2′-dicyclohexyl-6,6′-biphenyl-p,p′-biphenol,
3,3′-dicyclohexyl-5,5′-di-(o-tolyl)-p,p′-biphenol,
4-cyclohexylbiphenyl,
4,4′-dicyclohexylbiphenyl,
4-cyclohexyl-2,3-dimethylphenol,
5-cyclohexyl-2,4-dimethylphenol,
6-cyclohexyl-2,4-dimethyl-phenol,
4-cyclohexyl-2,5-dimethylphenol,
6-cyclohexyl-2,5-dimethylphenol,
4-cyclohexyl-2,6-dimethylphenol,
4′-cyclohexyl-m-terphenyl (4′-cyclohexyl-3-phenylbiphenyl) etc.

The reaction between the biphenyl hydrogen acceptor and the cyclohexyl hydrogen donor is carried out in the liquid phase at temperatures of about 300 to 500° C. Lower temperatures cause the reaction to be exceedingly slow. Since the reaction proceeds quite rapidly in this temperature range, there is no necessity for exceeding 500° C. By not exceeding about 500° C., thermal decomposition of the reactants and production of undesirable by-products is avoided. At these temperatures, since the reactants would be volatile and some of the hydrogen might escape, the reaction is carried out in a closed reaction vessel, capable of withstanding at least the autogenous pressure created by the reaction mixture at the temperature used. Higher pressures than the autogenous pressure created by the reaction mixture, of course can be used, but would offer no advantage. In order to avoid oxidation or any danger of explosion, the reaction should be carried out in an atmosphere substantially free of oxygen. This is conveniently provided by replacing any air in the reaction vessel with an inert gas, for example, nitrogen, prior to the start of the heating of the reaction mixture.

In order to cause the reaction to proceed readily, a hydrogenation catalyst must be present. Although various hydrogenation catalysts can be used, the most effective of all of the hydrogenation catalysts are nickel, platinum and palladium. Of these, palladium is preferred. The catalyst can be supported on various carriers which are generally inert as hydrogenation catalysts. Particularly effective carriers for the hydrogenation catalyst are those carriers known to be effective as dehydration catalysts. A particular effective carrier is aluminum oxide, especially when used as a support for the palladium catalyst. The amount of catalyst used is not critical, but generally is in the range of 0.001 to 10% by weight of the metal catalyst based on the weight of the reactants. For best catalytic activity the metal should be finely divided and have a very high surface area. Means should be provided to insure good contact of the total volume of the reactants with the catalyst. This may be done by rocking, shaking or stirring of the reaction mixture. Another means used in the examples, is to use a low concentration of catalyst on the support so that the volume of reactants is contained within the interstices of the granules of the supported catalyst.

Since all of the reactants and the products are liquid at the reaction temperature, no solvent is necessary, although an inert solvent can be used if desired. Preferably if a solvent is used, it will be the same as one of the products of the reaction in order to simplify the separation of the products from the reaction mixture in the same way as it is desirable to use both a biphenyl hydrogen acceptor and a cyclohexyl hydrogen donor, which will produce the same biphenyl product.

If more than one product is produced, separation can be readily effected by well known techniques, such as, distillation, crystallization, evaporation, etc. Separation of the catalyst is readily effected by well known techniques, for example, centrifugation or filtration using a solvent for the reaction products if they are a solid.

In order that those skilled in the art may readily understand my invention, the following examples are given by way of illustration and not by way of limitation. In all of the examples, all parts and percentages are by weight unless otherwise stated. Where analytical results are given, the theoretical values are given in parentheses following the analytical determined value.

EXAMPLE 1

A mixture of 1.7 g. of o-phenylphenol, 0.889 g. of o-cyclohexylphenol and 1 g. of 0.5% palladium on alumina pellets was placed in a sealed reaction vessel with a nitrogen atmosphere and heated at 350° C. for four hours. After cooling the reaction vessel, the contents were dissolved in ether, the catalyst removed, and the ether layer washed with dilute sodium hydroxide, dried with a desiccant, filtered and the ether evaporated yielding 2.15 g. of biphenyl, identified by its melting point and mixed melting point with an authentic sample. Similar results were obtained when the palladium catalyst was replaced by platinum on aluminum pellets and nickel on aluminum pellets and a platinum catalyst supported on carbon pellets. However, longer heating periods were required to produce the same yield of biphenyl product. Similar results are obtained when an equivalent amount of the methyl ether of o-phenylphenol and, also, the phenyl ether of o-phenylphenol are substituted for the o-phenylphenol. In the same manner an equivalent amount of o-cyclohexylbenzene can be substituted for the o-cyclohexylphenol.

EXAMPLE 2

A mixture of 3.38 of 2-aminobiphenyl, 1.76 g. of 2-cyclohexylphenol and 2 g. of 5% palladium on alumina was placed in a closed reaction vessel with a nitrogen atmosphere and heated at 350° C. for four hours. Because ammonia is a by-product, the reaction vessel was cooled with liquid nitrogen before opening. After opening of the reaction vessel, a strong odor of ammonia was apparent. The reaction mixture was dissolved in ether, the catalyst removed by filtration and the ether solution washed successively with dilute sodium hydroxide and dilute hydrochloric acid and then finally with water. After drying the ether solution over anhydrous magnesium sulfate, the ether was evaporated yielding 3.2 g. of biphenyl, identified by its melting point of 69° C., which showed no depression when mixed with an authentic sample.

EXAMPLE 3

A mixture of 2.45 g. of 2,2',6,6'-tetraphenyl-p,p'-biphenol (4,4' - dihydroxy - 3,3',5,5' - tetraphenylbiphenyl), 0.514 g. of 2,2',6,6'-tetracyclohexyl-p,p'-biphenol (4,4'-dihydroxy-3,3',5,5'-tetracyclohexylbiphenyl), and 2 g. of 0.5% palladium on alumina was placed in a closed reaction vessel after replacing the air with nitrogen. The reaction vessel was heated to 370° C. for 18½ hours. After cooling to room temperature, the reaction mixture was dissolved in chloroform and filtered to remove the catalyst. After evaporating the chloroform, the product was recrystallized from ethanol. After recrystallization, there was obtained 1.85 g. of 3,3',5,5'-tetraphenylbiphenyl, which melted at 231–232° C. Elemental analysis showed this product contained 94.2% C. (94.28) and 5.7% hydrogen (5.72).

When an equivalent amount of 2,2',6,6'-tetramethyl-p,p'-biphenol is substituted for the 2,2',6,6'-tetraphenyl-p,p'-biphenol, a mixture of 3,3',5,5'-tetramethylbiphenyl and 3,3',5,5'-tetraphenylbiphenyl is produced which is separated by distillation.

EXAMPLE 4

A mixture of 3.38 g. of 2,2'-biphenyl-p,p'-biphenol (4,4'-dihydroxy-3,3'diphenylbiphenyl), 1.76 g. of o-cyclohexylphenol and 2 g. of 0.5% palladium on alumina pellets was placed in a sealed reaction vessel which was flushed with nitrogen prior to closing. The reaction vessel was heated at 350° C. for 17 hours. After cooling to room temperature, the reaction mixture was dissolved in ether, the catalyst removed by filtration, the ether solution washed with a dilute aqueous sodium hydroxide and then with water. The ether solution was dried over a desiccant. After removal of the desiccant by filtration and evaporation of the ether, the two products were separated by two recrystallizations from ethanol in which the biphenyl product remained in solution and the 3,3'-diphenyl-4,4'-biphenyl crystallized. After filtration, the biphenyl is recovered from the ethanol. There was obtained 1.6 g. of 3,3'-diphenylbiphenyl (m-quaterphenyl) having a melting point of 85.5° C., which agrees with that reported in the literature.

The biphenyls of this invention have a wide variety of uses, as intermediates for preparing other compounds, or as stable high temperature heat transfer fluids. For example, the methyl groups on biphenyls having methyl substituents thereon, are readily oxidized by well known techniques to produce biphenyl carboxylic acids, which in turn are useful for making esters, amides, etc. If there are two carboxyl groups, the acid derivatives are useful for making polyesters with dihydric alcohols useful as synthetic polymers. When there are two methyl groups on adjacent carbon atoms of the benzene nucleus of the biphenyl derivative, oxidation produces an anhydride. If there are two such anhydride forming pairs of methyl groups, a dianhydride is produced which is useful for the making of polyamide-acids and polyimide resins with diamines.

All of the biphenyl compounds produced by this invention have good high temperature stability and very high boiling points. They therefore can be used individually or as mixtures, especially eutectic mixtures, as high temperature heat-transfer fluids in heat exchanged applications. They may also be used as dielectrics in either the solid or liquid form, either alone or as an additive to other dielectric materials in capacitors, transformers, etc. Those biphenyl products which are free of methyl groups will have the best oxidative stability at high temperatures in air and excellent stability towards actinic radiation, and especially ionizing radiation, for example, that encountered when these materials are present in the compositions used as light-valve fluids in image-projection systems. These and other uses for the compounds of this invention will readily be apparent to those skilled in the art.

Obviously, other modifications and variations of the present invention are possible in light of the above teachings. Therefore, it is to be understood that changes may be made in the particular embodiments of the invention described which are within the full intended scope of the invention as defined by the appended claims.

What I claim as new and desire to secure by Letters Patent of the United States is:

1. The process of producing a biphenyl which comprises reacting (1) a biphenyl having at least one substituent selected from the group consisting of —OR and —$NH_2$ where R is selected from the group consisting of hydrogen, methyl, phenyl and methyl-substituted phenyl, any remaining substituents on the carbon atoms of the biphenyl nucleus being the same as R as defined above, with (2) a hydroaromatic compound selected from the group consisting of (a) cyclohexyl-substituted benzenes and (b) cyclohexyl-substituted biphenyls, any remaining substituents on the carbon atoms of the phenyl nuclei of (a) and (b) being the same as R as defined above and, in addition, hydroxyl, said reaction being carried out in the liquid phase in the substantial absence of oxygen at a temperature in the range of from about 300° C. to 500° C. in the presence of a catalyst selected from the group consisting of nickel, platinum and palladium.

2. The process of claim 1 wherein the catalyst is palladium.

3. The process of claim 1 wherein the biphenyl of (1) and the hydroaromatic compound of (2) are so chosen that they both produce the same biphenyl in the reaction.

4. The process of claim 1 wherein the biphenyl of (1) is an amino-substituted biphenyl.

5. The process of claim 1 wherein the biphenyl of (1) is a biphenol.

6. The process of claim 1 wherein the biphenyl of (1) is 2,2′,6,6′-tetramethyl-p,p′-biphenol.

7. The process of claim 1 wherein the biphenyl of (1) is 2,2′-diphenyl-p,p′-biphenol.

8. The process of claim 1 wherein the biphenyl of (1) is 2,2′,6,6′-tetraphenyl-p,p′-biphenol.

9. 3,3′5,5′-tetraphenylbiphenyl.

No references cited.

DELBERT E. GANTZ, *Primary Examiner.*

CURTIS R. DAVIS, *Assistant Examiner.*

U.S. Cl. X.R.

260—670

UNITED STATES PATENT OFFICE
CERTIFICATE OF CORRECTION

Patent No. 3,415,896  December 10, 1968

Allan S. Hay

It is certified that error appears in the above identified patent and that said Letters Patent are hereby corrected as shown below:

Column 4, lines 16 to 20, the portion of the formula reading "3NH" should read -- $3NH_3$ --; lines 39 to 43, the lower right-hand portion of the formula reading "$-CH_3$ $^+$ $3H_2O$" should read -- $-CH_3$ $^+3H_2O$ --; lines 66 to 75, the formula should appear as shown below:

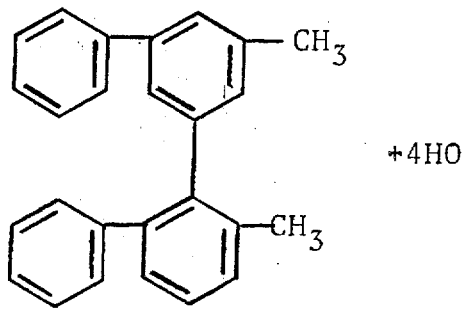

Signed and sealed this 17th day of March 1970.

(SEAL)
Attest:

EDWARD M. FLETCHER, JR.
Attesting Officer

WILLIAM E. SCHUYLER, JR.
Commissioner of Patents